United States Patent
Suzuki (10) Patent No.: US 10,728,403 B1
(45) Date of Patent: Jul. 28, 2020

(54) IMAGE FORMING APPARATUS AND DATA COMMUNICATION METHOD OF IMAGE FORMING APPARATUS

(71) Applicant: TOSHIBA TEC KABUSHIKI KAISHA, Tokyo (JP)

(72) Inventor: Takaaki Suzuki, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/269,236

(22) Filed: Feb. 6, 2019

(51) Int. Cl.
G06F 3/12 (2006.01)
H04N 1/00 (2006.01)
H04N 1/44 (2006.01)
H04N 1/327 (2006.01)

(52) U.S. Cl.
CPC ....... *H04N 1/00342* (2013.01); *G06F 3/1222* (2013.01); *G06F 3/1238* (2013.01); *G06F 3/1292* (2013.01); *H04N 1/00244* (2013.01); *H04N 1/00307* (2013.01); *H04N 1/00973* (2013.01); *H04N 1/32702* (2013.01); *H04N 1/4426* (2013.01)

(58) Field of Classification Search
CPC .... G06F 3/1222; G06F 3/1238; G06F 3/1292; H04N 1/00342; H04N 1/00244; H04N 1/00307; H04N 1/00973; H04N 1/32702; H04N 1/4426; H04M 1/7253
See application file for complete search history.

(56) References Cited

U.S. PATENT DOCUMENTS

| | | | |
|---|---|---|---|
| 2013/0196702 A1* | 8/2013 | Shibata | H04W 76/10 455/509 |
| 2013/0258408 A1* | 10/2013 | Mizutani | G03G 15/5091 358/1.16 |
| 2013/0260683 A1* | 10/2013 | Suzuki | G06F 3/1204 455/41.1 |
| 2014/0092413 A1* | 4/2014 | Shibata | H04N 1/00204 358/1.13 |
| 2014/0114920 A1* | 4/2014 | Zhang | H04L 67/06 707/634 |
| 2014/0240774 A1* | 8/2014 | Suzuki | G06F 3/1236 358/1.15 |
| 2016/0054962 A1* | 2/2016 | Park | H04L 41/0806 358/1.15 |

(Continued)

OTHER PUBLICATIONS

U.S. Appl. No. 15/713,911, filed Sep. 25, 2017.

*Primary Examiner* — Moustapha Diaby
(74) *Attorney, Agent, or Firm* — Kim & Stewart LLP (57) ABSTRACT

An image forming apparatus includes a short-range wireless communication device to communicate with a portable terminal via short-range wireless communication, a first wireless communication device to communicate with the portable terminal via a direct wireless connection, a second wireless communication device to communicate via a network connected to the image forming apparatus, and a control device. The control device includes an authentication unit that determines whether o a device within short-range wireless communication range has been authenticated. The control device sets up a connection for data communication via the network when the portable terminal has been authenticated and set up the direct wireless connection for data communication when the portable terminal has not been authenticated.

18 Claims, 5 Drawing Sheets

(56) References Cited

U.S. PATENT DOCUMENTS

| | | | |
|---|---|---|---|
| 2016/0248511 A1* | 8/2016 | Wang | H04L 41/0803 |
| 2017/0134609 A1* | 5/2017 | Park | H04N 1/00278 |
| 2017/0272126 A1* | 9/2017 | Suzuki | H04B 5/0075 |
| 2017/0272896 A1* | 9/2017 | Suzuki | H04W 4/80 |

* cited by examiner

IMAGE FORMING APPARATUS AND DATA COMMUNICATION METHOD OF IMAGE FORMING APPARATUS

FIELD Embodiments described herein relate generally to an image forming apparatus and a data communication method of an image forming apparatus.

BACKGROUND

In a meeting or conference with an external client, it would be convenient to print image data stored on client's own portable terminal, such as a smartphone or a tablet, by temporarily connecting the client's portable terminal to a multifunction peripheral that is connected to a secured internal network or the like. Accordingly, a multifunction peripheral that allows the client's portable terminal to use the internal network has been proposed.

In such an example, the multifunction peripheral may directly transmit connection information necessary for using the internal network to the portable terminal via near-field communication (NFC) or the like rather than via the internal network itself. A portable terminal that receives the connection information can then use the internal network for high-speed communication with the multifunction peripheral, as long as the necessary connection information is provided. Accordingly, an external client can easily print large image data files from his/her portable terminal via the multifunction peripheral.

However, in such a case, the image data stored on the client's portable terminal is transmitted via the internal network. As such, a non-managed, and thus perhaps unprotected or unsecured, portable terminal that is not normally permitted to access the internal network is temporarily connected to the internal network such that communication can be established therebetween. Such a connection by a non-managed device, even if temporary, poses a risk to the overall security of the internal network.

DETAILED DESCRIPTION

An embodiment of the present disclosure addresses the use and security circumstances described above and enables use of a networked multifunction peripheral without comprising a security level of a secured internal network connected to the multifunction peripheral.

According to one embodiment, an image forming apparatus comprises: a short-range wireless communication device configured to communicate with a portable terminal via short-range wireless communication; a first wireless communication device configured to communicate with the portable terminal via a direct wireless connection with the portable terminal; a second wireless communication device configured to communicate with a designated communication device via a network connected to the image forming apparatus; and a control device. The control device includes an authentication unit that determines whether or not a device within range of the short-range wireless communication device has been authenticated. The control device is configured to set up a connection for data communication between the second wireless communication device and the designated communication device via the network when the portable terminal has been authenticated and set up the direct wireless connection for data communication between the first wireless communication device and the portable terminal when the portable terminal has not been authenticated.

First Embodiment

Figure 1:
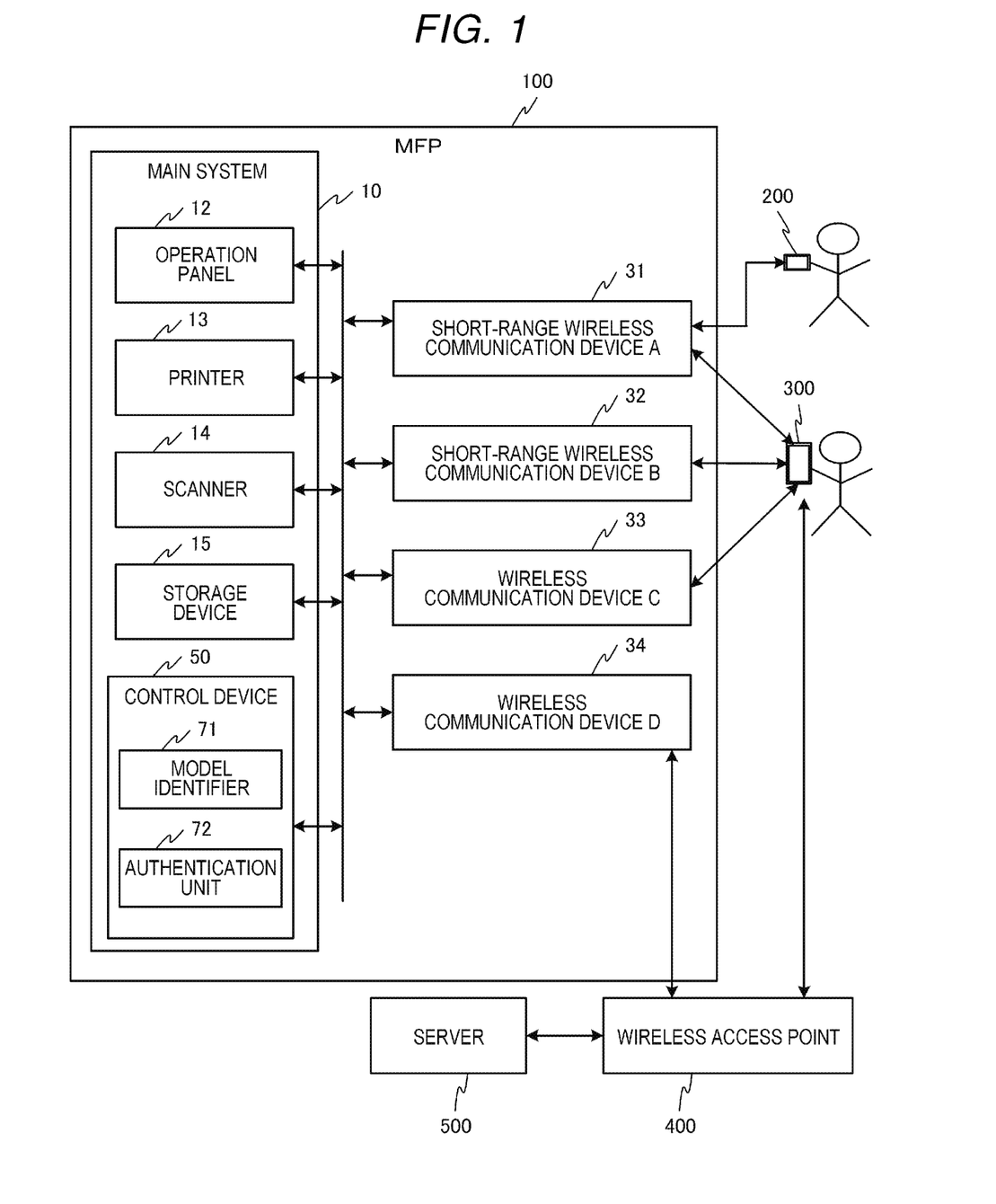
FIG. 1 is a block diagram illustrating a configuration example of a digital multifunction peripheral which is an image forming apparatus according to a first embodiment.

Hereinafter, a first embodiment will be described with reference to the drawings. FIG. 1 is a block diagram illustrating a configuration example of a digital multifunction peripheral (MFP) 100, which is an image forming apparatus, and a communication system including the MFP 100. As illustrated in FIG. 1, the communication system includes the MFP 100, a contactless card 200, a portable terminal 300, a wireless access point 400, and a server 500.

The MFP 100 is an image forming apparatus having a printing function, a copying function, a scanning function, and the like.

The contactless card 200 is a card capable of performing short-range wireless communication with the MFP 100 while in a non-contact state. Here, it is assumed that the contactless card 200 performs communication by a contactless communication method such as near-field communication (NFC). In this example, the portable terminal 300 is a smartphone, a cellular phone, a tablet terminal, or the like. The portable terminal 300 can perform short-range wireless communication with the MFP 100 via NFC, high-speed wireless communication with the MFP 100 via a Wi-Fi direct connection, and high-speed wireless communication with the MFP 100 via a wireless local area network (LAN) utilizing the wireless access point 400. A Wi-Fi direct connection (also referred to for simplicity as "Wi-Fi direct") is a wireless communication scheme via which two different devices may directly communicate with each other wirelessly in a 1:1 manner without using a wireless access point (e.g., wireless access point 400 of the WLAN). The server 500 is a communication device that stores image data to be printed by the MFP 100. The server 500 is, for example, a general-purpose personal computer. The MFP 100 and the server 500 are connected to an internal network. When the portable terminal 300 has undergone an authentication process, the portable terminal 300 may transmit image data to the MFP 100 via the wireless access point 400.

MFP

Next, a configuration of the MFP 100. As illustrated in FIG. 1, the MFP 100 includes a main system 10, a storage device 15, a short-range wireless communication device 31, a short-range wireless communication device 32, a wireless communication device 33, and a wireless communication device 34.

The main system 10 provides printing functions necessary for a digital multifunction peripheral. The main system 10 includes an operation panel 12, a printer 13, a scanner 14, the storage device 15, and a control device 50.

The operation panel 12 includes a display device and an input device. The display device includes, for example, a liquid crystal display, an organic electroluminescence (EL) display, or the like. The input device includes, for example, a touch panel, a keyboard, a number keypad, and the like.

The printer 13 is an image forming apparatus that prints an image on a recording medium such as paper.

The scanner 14 includes an image pickup device such as a charge-coupled device (CCD) image sensor and an optical system which guides light from an original document to the image pickup device. The scanner 14 reads an image on the original document to provide image data corresponding to the scanned original document. For example, the scanner 14 obtains the image data by optically scanning the image printed on the original document.

The storage device 15 includes a rewritable nonvolatile memory. The storage device 15 stores image data and various programs such as an application program.

The short-range wireless communication device 31 is a wireless communication module that performs communication via NFC. The short-range wireless communication device 31 communicates with the contactless card 200 and the portable terminal 300. The short-range wireless communication device 31 in this example operates in compliance with a standard defined by ISO/IEC 1443 or ISO/IEC 18092. For example, the short-range wireless communication device 31 receives model information, authentication information, and the like from the contactless card 200 and the portable terminal 300, and transmits them to the control device 50.

Figure 2:
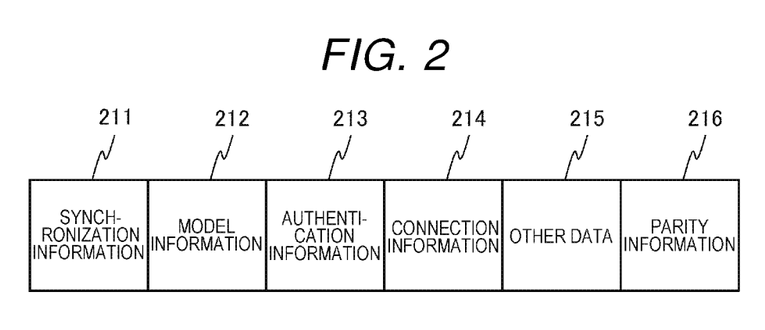
FIG. 2 is a diagram for explaining a signal configuration of a packet transmitted via short-range wireless communication according to the first embodiment.

FIG. 2 illustrates an example of a signal configuration of a packet transmitted from the contactless card 200 and the portable terminal 300 via NFC. As illustrated in FIG. 2, the packet includes synchronization information 211, model information 212, authentication information 213, connection information 214, other data 215, and parity information 216.

The synchronization information 211 is information identifying the position of a head of the packet received by the short-range wireless communication device 31 or the short-range wireless communication device 32. The number of bits and a bit pattern for binary information (0 and 1) of the synchronization information 211 are prescribed according to a standard. The model information 212 is information specifying the type of a device. Here, the model information 212 specifies whether a device approaching the short-range wireless communication device 31 or the short-range wireless communication device 32 is the contactless card 200 or the portable terminal 300. For example, the model information value "01" represents a contactless card, and the model information value "10" represents a portable terminal. The authentication information 213 is information for determining whether to allow communication with the MFP 100. The authentication information 213 is, for example, information specifying a user, such as a user identification (ID) number or code. The connection information 214 is either information regarding connection to the server 500 that stores image data to be printed by the MFP 100 or information regarding connection to the portable terminal 300. The connection information 214 includes connection information for providing communication between the MFP 100 and the portable terminal 300 via Wi-Fi direct or connection information for providing communication between the MFP 100 and the portable terminal 300 via the wireless access point 400. The other data 215 is arbitrary information. The parity information 216 is information for checking whether there is an error in a received packet. The parity information 216 is generated, for example, based on a rule such as even parity.

When a parity error is detected, the short-range wireless communication device 31 or the short-range wireless communication device 32 discards the information of the received packet.

The short-range wireless communication device 32 is a wireless communication module that communicates with the portable terminal 300 via NFC. The short-range wireless communication device 32 transmits the received model information 212 and the authentication information 213 to the control device 50 only when the received model information 212 is "10," representing a portable terminal. When the received model information 212 is "01," representing a contactless card, the short-range wireless communication device 32 does not process anything.

The wireless communication device 33 has a function of directly communicating with the portable terminal 300 by a wireless communication method at a communication speed that is faster than the communication speed of the short-range wireless communication method, while not being connected to a separate network. That is, the wireless communication device 33 directly communicates with the portable terminal 300 via Wi-Fi direct. A permissible distance of wireless communication via Wi-Fi direct is set to, for example, about 3 m. The permissible wireless communication distance can be determined in consideration of security and convenience. This wireless communicable distance can be adjusted by changing the transmission power of the wireless communication device 33 and the portable terminal 300. The transmission power of the portable terminal 300 is generally set by application software installed in the portable terminal 300.

The wireless communication device 34 communicates with the portable terminal 300 or the server 500 via a network by a wireless communication method that is at a communication speed faster than a communication speed of the short-range wireless communication method. The network in this instance is an internal, secured network. Specifically, the wireless communication device 34 performs data communication with the portable terminal 300 or the server 500 via the wireless access point 400. The portable terminal 300 and the server 500 transmit image data to the MFP 100 via the wireless access point 400 according to a user's instructions.

The control device 50 may physically include a central processing unit (CPU), a read only memory (ROM), a random access memory (RAM), and the like. Various programs including an application program for the MFP 100 are recorded in the ROM. The CPU executes various processes by reading a program from the ROM. The RAM functions as a work area of the CPU.

Functionally, the control device 50 includes a model identifier 71 and an authentication unit 72. The model identifier 71 determines whether a device approaching the MFP 100 is the contactless card 200 or the portable terminal 300 on the basis of the model information 212 obtained from the contactless card 200 or the portable terminal 300 approaching the MFP 100. For example, the model identifier 71 identifies the device as a contactless card 200 when the model information 212 is "01", and identifies the device as a portable terminal 300 when the model information is "10".

The authentication unit 72 determines whether the authentication information 213 obtained from the contactless card 200 or the portable terminal 300 approaching the MFP 100 is registered authentication information. In particular, the authentication unit 72 determines whether the received authentication information 213 is registered authentication information by comparing the received authentication information 213 with the information stored in the storage device 15.

When the authentication information 213 sent from the portable terminal 300 is registered authentication information, the control device 50 sets up a connection for data communication between the wireless communication device 34 and the server 500 via the internal network. When the authentication information 213 from the portable terminal 300 is not registered authentication information, the control device 50 sets up a connection for data communication between the wireless communication device 33 and the portable terminal 300 via Wi-Fi direct rather than via the internal network.

Contactless Card

The contactless card 200 performs contactless communication with the short-range wireless communication device 31 of the MFP 100 via NFC. The contactless card 200 operates in compliance with a standard defined in ISO/IEC 1443 or ISO/IEC 18092. A communication distance by NFC is about 10 cm in this instance. The contactless card 200 includes an antenna for short-range wireless communication, an integrated circuit (IC) for communication control, and the like. As illustrated in FIG. 2, the contactless card 200 transmits model information 212, authentication information 213, and the like. For example, the contactless card 200 transmits "01" as the model information 212.

Portable Terminal

Figure 3:
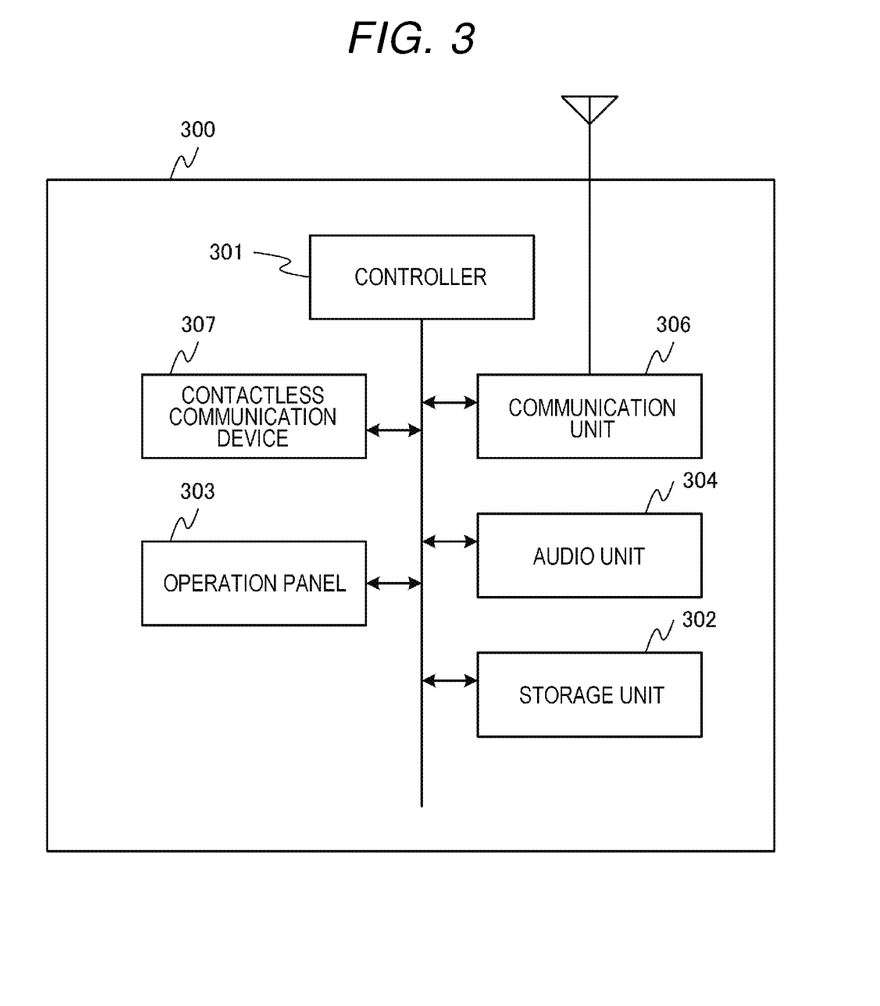
FIG. 3 is a block diagram illustrating a configuration example of a portable terminal according to the first embodiment.

FIG. 3 is a block diagram illustrating a configuration example of a portable terminal 300. As illustrated in FIG. 3, the portable terminal 300 includes a controller 301, a storage unit 302, an operation panel 303, an audio unit 304, a communication unit 306, and a contactless communication device 307.

The controller 301 includes a CPU, a ROM, a RAM, and the like. The CPU executes various functions by executing the application program stored in the ROM. The RAM is used as, for example, a work area of the CPU.

The storage unit 302 is a nonvolatile memory that stores various types of data. An application program for transmitting image data to the MFP 100 is stored in the storage unit 302.

The operation panel 303 includes a display device and an input device. The display device includes, for example, a liquid crystal display, an organic electroluminescence (EL) display, or the like. The input device includes, for example, a touch panel, a keyboard, a number keypad, and the like.

The audio unit 304 is configured to receive sound input thereto or to output sound therefrom. The audio unit 304 includes a speaker, a receiver, a microphone and the like.

The communication unit 306 performs wireless communication via an antenna. The communication unit 306 has a communication function of allowing the portable terminal 300 to communicate with the MFP 100 via the internal network. In addition, the communication unit 306 has a communication function for allowing the portable terminal 300 to directly communicate with the MFP 100 via Wi-Fi direct rather than via the internal network. For example, the communication unit 306 transmits image data to be printed by the MFP 100. When the image data is transmitted to the MFP 100 via Wi-Fi direct, the transmission power of the communication unit 306 is limited such that a maximum communication distance is about 3 m.

The contactless communication device 307 performs contactless communication with the short-range wireless communication device 31 of the MFP 100 via NFC. The contactless communication device 307 includes an antenna for short-range wireless communication, an IC for communication control, and the like. For example, as illustrated in FIG. 2, the contactless communication device 307 transmits the model information 212, the authentication information 213, and the like. For example, the contactless communication device 307 transmits "10" as the model information 212.

Figure 4:
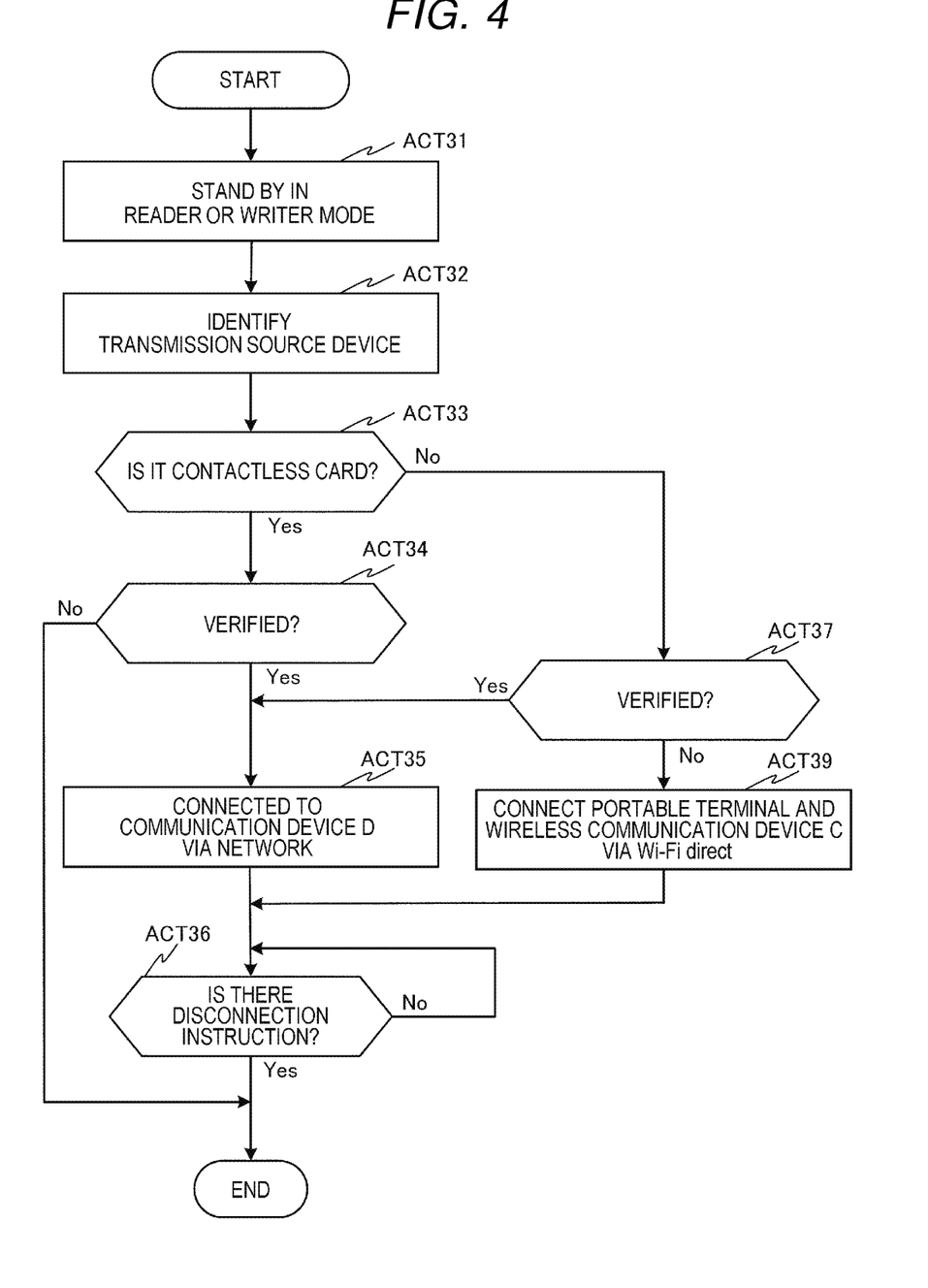
FIG. 4 is a flowchart illustrating an operation of a digital multifunction peripheral which is an image forming apparatus according to the first embodiment.

FIG. 4 is a flowchart illustrating an operation of the MFP 100.

Contactless Card case

First, a case in which the contactless card 200 is brought close to the short-range wireless communication device 31 will be described. The short-range wireless communication device 31 stands by in a reader or writer mode (ACT31). Specifically, the short-range wireless communication device 31 stands by for reception while transmitting a predetermined radio wave signal. The predetermined radio wave signal is in compliance with an NFC standard. The contactless card 200 operates in a card emulation mode, for example.

Upon receiving the predetermined radio wave signal transmitted from the short-range radio communication device 31, the contactless card 200 transmits a packet (see e.g., FIG. 2) including model information 212, authentication information 213, and the like to the short-range radio communication device 31 via NFC. In this instance, the value "01" is transmitted as the model information 212. The short-range wireless communication device 31 transmits the model information 212, the authentication information 213, and the like to the control device 50. The control device 50 identifies the model of the transmission source on the basis of the model information 212 (ACT32). Here, the device approaching the short-range wireless communication device 31 is the contactless card 200 (ACT33: Yes), so the control device 50 receives "01" as the model information 212 and thus determines that the device approaching the MFP 100 is a contactless card 200. The control device 50 proceeds to ACT34.

Next, the control device 50 determines whether the received authentication information 213 (for example, a user ID) has been registered previously (ACT34). In this instance, the control device 50 determines whether the user ID matches a user ID previously stored in the storage device 15. When the control device 50 determines that the received authentication information 213 is not registered authentication information (ACT34: No), the control device 50 ends the processing.

On the other hand, when the control device 50 determines that the received authentication information 213 has been registered previously (ACT34: Yes), the control device 50 proceeds to ACT35.

The control device 50 sets up a connection for data communication between the server 500 and the wireless communication device 34 via the internal network on the basis of the received connection information 214 (ACT35). In this instance, the control device 50 sets an Internet protocol (IP) address of the server 500 in the wireless communication device 34. A user may then use the functions of the application software to request the server 500 to transmit image data via the wireless communication device 34. The wireless communication device 34 receives the image data transmitted from the server 500. The control device 50 stores the image data received from the server 500 in the storage device 15.

When the connection for data communication between the portable terminal 300 and the wireless communication device 34 has been set up, the control device 50 proceeds to ACT36. When an instruction to disconnect the communication is given by the user (ACT36: Yes), the control device 50 disconnects the data communication between the wireless communication device 34 and the server 500 and then ends the processing.

A case in which a contactless card 200 is brought close to the short-range wireless communication device 32 will now be described. The short-range wireless communication device 32 does not process anything when the model information 212 is a value"01" representing the contactless card 200. Accordingly, processing in ACT31 illustrated in FIG. 4 continues. Alternatively, when the control device 50 identifies that the model information 212 is the value "01" representing the contactless card 200, the control device 50 ends the processing at ACT32.

Portable Terminal case

Next, a case in which a portable terminal 300 is brought close to the short-range wireless communication device 31 will be described. It is assumed that an application program for communicating with the MFP 100 is installed in the portable terminal 300 and furthermore a user has started this application program.

The short-range wireless communication device 31 stands by in the reader or writer mode (ACT31). In this instance, the short-range wireless communication device 31 stands by in a reception mode while transmitting a predetermined radio wave signal. The predetermined radio wave signal is a radio wave that is in compliance with a NFC standard. The portable terminal 300 operates in a card emulation mode, or the like.

When the portable terminal 300 receives the predetermined radio wave signal transmitted from the short-range wireless communication device 31, the portable terminal 300 transmits a packet (see e.g., FIG. 2) including model information 212, authentication information 213, and the like to the short-range wireless communication device 31. In this instance, a value "10" is transmitted as the model information 212. The short-range wireless communication device 31 transmits the model information 212, the authentication information 213, and the like to the control device 50. The control device 50 identifies the model of the transmission source on the basis of the model information 212 (ACT32). Here, since the device approaching the short-range wireless communication device 31 is the portable terminal 300 (ACT33: No), the control device 50 receives "10" as the model information 212, determines that the device approaching the MFP 100 is a portable terminal 300, and then proceeds to ACT 37.

Next, the control device 50 determines whether the received authentication information 213 is authentication information that was registered previously (ACT 37). When the control device 50 determines that the received authentication information 213 is authentication information that was registered previously (ACT 37: Yes), the control device 50 proceeds to ACT35. When connection information for connecting the portable terminal 300 to the MFP 100 via the wireless access point 400 is included in the connection information 214, the control device 50 connects the portable terminal 300 and the wireless communication device 34 via the internal network.

On the other hand, when the control device 50 determines that the authentication information 213 is not previously registered authentication information (ACT 37: No), the control device 50 proceeds to ACT39.

The control device 50 will set up a connection for communication between the portable terminal 300 and the wireless communication device 33 that does not utilize the internal network (ACT39). In this instance, the control device 50 connects the portable terminal 300 and the wireless communication device 33 via Wi-Fi direct . A user may then request the portable terminal 300 to transmit the image data to the MFP 100 by using the functions of the application software. Upon receiving the request to transmit the image data via Wi-Fi direct, the portable terminal 300 switches mode from a card emulation mode to a peer-to-peer (P2P) mode. The P2P mode is also referred to as an inter-terminal communication mode. Communication between the wireless communication device 33 and the portable terminal 300 via Wi-Fi direct is a P2P mode communication. The portable terminal 300 will transmit the image data to the wireless communication device 33 via Wi-Fi direct.

When data communication is performed via Wi-Fi direct, the portable terminal 300 must be kept at a position within about 3 m or so from the wireless communication device 33. The control device 50 stores data received from the portable terminal 300 in the storage device 15.

Once the connection for data communication between the portable terminal 300 and the wireless communication device 33 is set up, the control device 50 proceeds to ACT36. When an instruction to disconnect the communication is given from the user (ACT36: Yes), the control device 50 disconnects the data communication between the wireless communication device 33 and the portable terminal 300, and ends the processing.

Next, a case in which the portable terminal 300 is brought close to the short-range wireless communication device 32 will be described. The short-range wireless communication device 32 stands by in the reader or writer mode (ACT31). The portable terminal 300 operates in a card emulation mode.

Upon receiving the predetermined radio wave signal transmitted from the short-range wireless communication device 32, the portable terminal 300 transmits a packet (see e.g., FIG. 2) including model information 212, authentication information 213, and the like to the short-range wireless communication device 32. In this instance, the value "10" is transmitted as the model information 212. The short-range wireless communication device transmits the model information 212, the authentication information 213, and the like to the control device 50. The control device 50 identifies the model of the transmission source on the basis of the model information 212 (ACT32). Here, since the device approaching the short-range wireless communication device 32 is a portable terminal 300 (ACT33: No), the control device 50 receives "10" as the model information 212, thus determines that the device approaching the MFP 100 is a portable terminal 300, and then proceeds to ACT 37. Subsequent processing is as described above.

Although a case in which the MFP 100 is an image forming apparatus has been described, in other examples, an internal network-connected image forming apparatus is not limited to a MFP type device and, in general, any type of internal network-connected apparatus may be used as long as it can exchange information with a portable terminal in the above described manners. For example, the internal networked-connected apparatus may be a settlement device, such as a point-of-sale (POS) terminal, which is configured to permit the purchase of a commodity, an informational terminal device, such as a kiosk terminal, which is installed at a street corner or a store, or the like.

Furthermore, a case in which the printer 13 is provided as an image forming apparatus has been described above, but it should be noted that printer 13 is not limited to any specific type of image forming apparatus. For example, printer 13 may be an electrophotographic image forming apparatus, an inkjet image forming apparatus, or a thermal image forming apparatus.

As described above, the MFP 100 according to the first embodiment may select between communication performed via an internal network or communication performed not via the internal network. In particular, the MFP 100 as described above has a function of directly communicating with the portable terminal 300 via Wi-Fi direct rather than via the internal network. Accordingly, when image data is to be transmitted to the MFP 100 from a portable terminal 300 that is not registered/authenticatable, the image data may still be transmitted to the MFP 100 by other than through the internal network (e.g., via Wi-Fi Direct), thereby enabling use of the MFP 100 by an unsecured terminal without lowering an overall security level of the internal network.

Furthermore, the MFP 100 according to the first embodiment is configured to communicate with external devices on the basis of model information received via short-range wireless communication. Accordingly, it is possible to limit a user's required efforts in setting a connection route for data communication.

Second Embodiment

In a second embodiment, a case in which a determination as to whether to connect a portable terminal 300 via Wi-Fi direct is made on the basis of connection information included in information received via NFC will be described.

As illustrated in FIG. 2, connection information 214 is included in the packet to be transmitted via NFC. The connection information 214 is information that sets a communication route through which the MFP 100 obtains image data. In this instance, the connection information 214 specifies whether the transmission source for the image data will be the server 500 or the portable terminal 300. For example, the connection information 214 may include connection information including an IP address of the wireless access point 400 and an IP address of the server 500. In another case, the connection information 214 may include connection information including the IP address of the wireless access point 400 and an IP address of the portable terminal 300. In another case, the connection information 214 may include connection information for directly communicating with the portable terminal 300 via Wi-Fi direct.

Contactless Card Case

Figure 5:
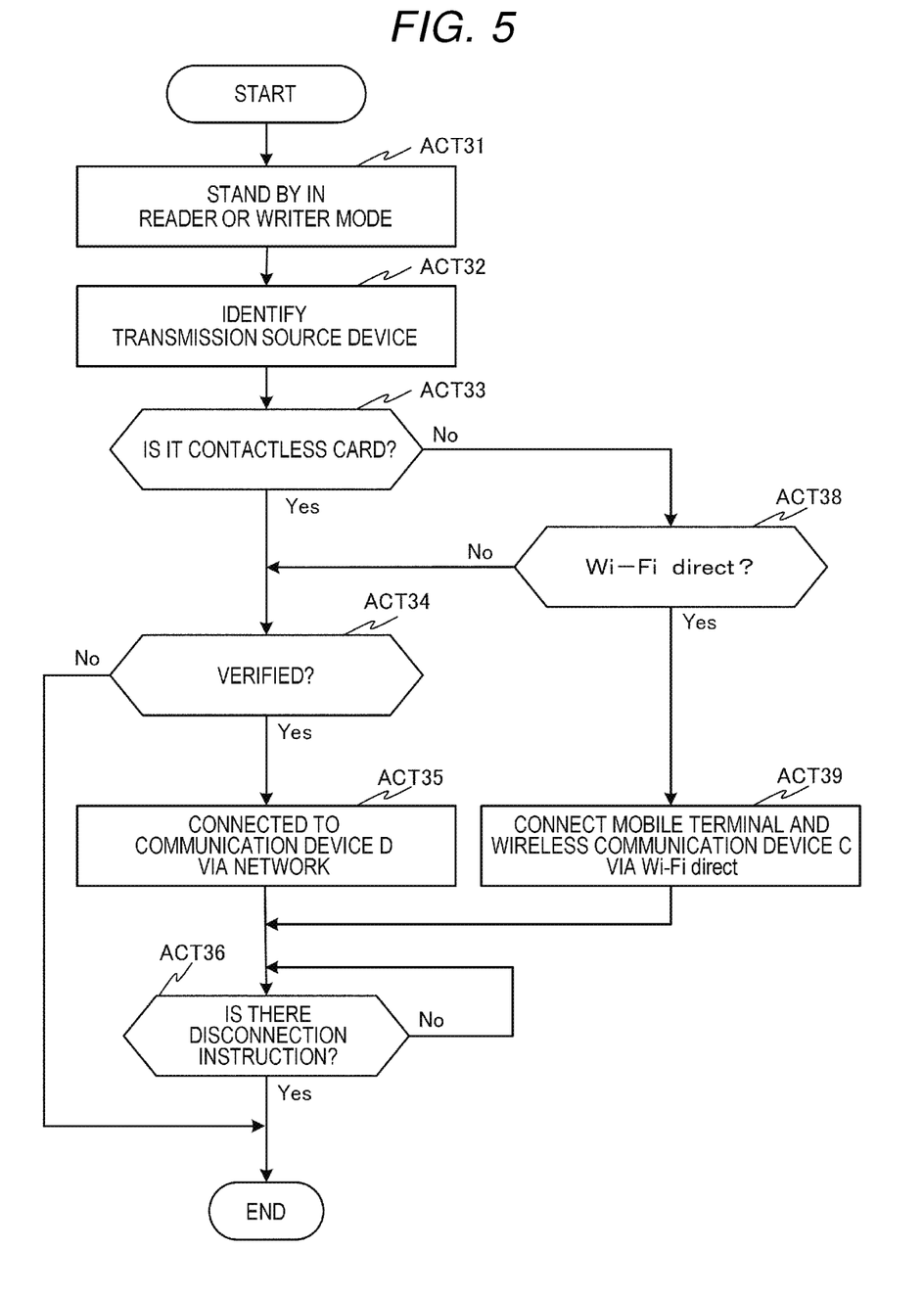
FIG. 5 is a flowchart illustrating an operation of a digital multifunction peripheral which is an image forming apparatus according to a second embodiment.

First, a case in which a contactless card 200 is brought close to the short-range wireless communication device 31 will be described. The short-range wireless communication device 31 stands by in the reader or writer mode (ACT31). The short-range wireless communication device 31 stands by in the reception mode while transmitting a predetermined radio wave signal. The predetermined radio wave signal is a radio wave that is in compliance with an NFC standard. The contactless card 200 operates in a card emulation mode.

When the contactless card 200 receives the predetermined radio wave signal from the short-range wireless communication device 31, the contactless card 200 transmits a packet (see e.g., FIG. 2) including the model information 212, the authentication information 213, the connection information 214, and the like to the short-range wireless communication device 31. The short-range wireless communication device 31 transmits the model information 212, the authentication information 213, the connection information 214, and the like to the control device 50. The control device 50 identifies the model of the transmission source on the basis of the model information 212 (ACT32). Here, since the device approaching the short-range wireless communication device 31 is a contactless card 200 (ACT33: Yes), the control device 50 receives the value "01" as the model information 212 and thus determines that the device approaching the MFP 100 is a contactless card 200. The control device 50 proceeds to ACT34.

Next, the control device 50 determines whether the received authentication information 213 (for example, a user ID) has been registered previously (ACT34). When the control device 50 determines that the received authentication information 213 has not been registered previously (ACT34: No), the control device 50 ends the processing. On the other hand, when the control device 50 determines that the received authentication information 213 has been registered previously (ACT34: Yes), the control device 50 proceeds to ACT35.

The control device 50 sets up a connection for data communication between the server 500 and the wireless communication device 34 via the network on the basis of the connection information 214 (ACT35) . In this instance, the control device 50 sets the IP address of the server 500 in the wireless communication device 34. A user may use the functions of the application software to request the server 500 to transmit image data via the wireless communication device 34. The wireless communication device 34 receives the image data transmitted from the server 500. The control device 50 stores the image data received from the server 500 in the storage device 15.

Once the connection for data communication between the portable terminal 300 and the wireless communication device 34 is set up, the control device 50 proceeds to ACT36. When an instruction to disconnect the communication is given from the user (ACT36: Yes), the control device 50 disconnects the data communication between the wireless communication device 34 and the server 500, and ends the processing.

Portable Terminal case

Next, a case in which a portable terminal 300 is brought close to the short-range wireless communication device 31 will be described. It is assumed that an application program for communicating with the MFP 100 is installed in the portable terminal 300, and the application program has been started.

The short-range wireless communication device 31 stands by in the reader or writer mode (ACT31). The short-range wireless communication device 31 stands by in the reception mode while transmitting a predetermined radio wave signal. The predetermined radio wave signal is a radio wave that is in compliance with the NFC standard. The portable terminal 300 operates in a card emulation mode.

When receiving the predetermined radio wave signal from the short-range wireless communication device 31, the portable terminal 300 transmits a packet (see e.g., FIG. 2) including model information 212, authentication information 213, connection information 214, and the like to the short-range wireless communication device 31. The short-range wireless communication device 31 transmits the model information 212, the authentication information 213, the connection information 214, and the like to the control device 50. The control device 50 identifies the model of the transmission source on the basis of the model information 212 (ACT32). Here, since the device approaching the short-range wireless communication device 31 is a portable terminal 300 (ACT33: No), the control device 50 receives the value "10" as the model information 212, thus determines that the device approaching the MFP 100 is a portable terminal 300, and then proceeds to ACT38.

Next, the control device 50 checks information regarding a communication route to the portable terminal 300, which has been included in the connection information 214 (ACT38). If the connection information 214 does not indicate communication with the portable terminal 300 is to be performed via Wi-Fi direct rather than via the network (ACT38: No), the control device 50 proceeds to ACT34.

On the other hand, if the connection information 214 indicates communication with the portable terminal 300 is to be performed via Wi-Fi direct rather than via the internal network (ACT38: Yes), the control device 50 proceeds to ACT39.

The control device 50 sets up a connection for data communication between the portable terminal 300 and the wireless communication device 33 that does not utilize the internal network (ACT39). In this instance, the control device 50 connects the portable terminal 300 and the wireless communication device 33 via Wi-Fi direct. A user may use the functions of the application software to request the portable terminal 300 to transmit image data via the wireless communication device 33. Upon receiving a request to transmit the image data via Wi-Fi direct, the portable terminal 300 switches mode from a card emulation mode to a P2P mode. The portable terminal 300 then transmits the image data to the wireless communication device 33 via Wi-Fi direct. The control device 50 stores the data received from the portable terminal 300 in the storage device 15.

Once the connection for data communication between the portable terminal 300 and the wireless communication device 33 is set up, the control device 50 proceeds to ACT36. When an instruction to disconnect the communication is given from the user (ACT36: Yes), the control device 50 disconnects the data communication between the wireless communication device 33 and the portable terminal 300, and ends the processing.

First Modified Example

A case in which the decision to connect the portable terminal 300 via Wi-Fi direct is made on the basis of connection information 214 included in the packet transmitted from the portable terminal 300 via NFC has been described above in the second embodiment. However, the control device 50 of the MFP 100 according to a first modified example sets direct communication to be performed via Wi-Fi direct when no connection information 214 is included in the packet received from the portable terminal 300 via NFC. In this modified example, a communication route via Wi-Fi-direct rather than via the internal network may be set by default even if a particular portable terminal 300 is not configured to provide connection information 214 (or relevant portions of connection information 214), thereby still enabling effective use of the MFP 100 by such a portable terminal 300 without lowering a security level of the internal network.

Thus, for the MFP 100 according to the first modified example, if the connection information 214 does not include information for connection to the server 500 via the internal network or connection to the server 500 via the wireless access point 400, the control device 50 may set direct communication between the MFP 100 and the portable terminal 300 via Wi-Fi direct by default.

In the above examples, Wi-Fi direct has been described above as an example of communication between a MFP 100 and a portable terminal 300 which does not require connection to the internal, secured network. However, to the present disclosure is not limited to Wi-Fi direct for this type of communication. For example, wireless communication methods such as Bluetooth®, ultra-wide band (UWB) communication or the like may be used instead for communications of this type.

Furthermore, a case in which the wireless communication device 33 and the wireless communication device 34 are provided in different devices has been described above. However, the wireless communication device 33 and the wireless communication device 34 may be configured as one wireless communication device, and whether communication is to be performed via the network or via Wi-Fi direct (or other type) may be selected by switching between wireless communication modes of the one wireless communication device.

In addition, a case in which the short-range wireless communication device 31 and the short-range wireless communication device 32 operate in compliance with a standard defined in ISO/IEC 1443 or ISO/IEC 18092 has been described above. However, the standard utilized for short-range wireless communication is not limited thereto. For example, any industrial standard (as presently promulgated or later revised, proposed, or adopted) or any proprietary communication standard as determined by an individual manufacturer or the like may be applied for short-range wireless communication according to the present disclosure.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions, and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An image forming apparatus, comprising:
a short-range wireless communication device configured to communicate with a portable terminal via short-range wireless communication;
a first wireless communication device configured to communicate with the portable terminal via a direct wireless connection to the portable terminal;
a second wireless communication device configured to communicate with an authenticated portable terminal via a secured network; and
a control device configured to perform authentication processing of a portable terminal based on authentication information received via the short-range wireless communication device to set up a connection for data communication between the second wireless communication device and the portable terminal via the secured network if the portable terminal has been successfully authenticated in the authentication processing, and to set up the direct wireless connection between the first wireless communication device and the portable terminal when the portable terminal has not been successfully authenticated in the authentication processing.

2. The image forming apparatus according to claim 1, wherein the short-range wireless communication device is a near-field communication (NFC) device.

3. The image forming apparatus according to claim 1, wherein the first wireless communication device is capable of directly communicating with the portable terminal via Wi-Fi direct.

4. The image forming apparatus according to claim 1, wherein the second wireless communication device is connected to a wireless access point.

5. The image forming apparatus according to claim 1, wherein, when authentication information received via short-range wireless communication does not include information permitting connection to the secured network, the control device sets up a connection for data communication between the first wireless communication device and the portable terminal via Wi-Fi direct rather than via the secured network.

6. The image forming apparatus according to claim 1, wherein, when authentication information received through short-range wireless communication includes information permitting connection to the secured network, the control device sets up a connection for data communication between the second wireless communication device and the portable terminal via the secured network.

7. The image forming apparatus according to claim 6, wherein the information permitting connection to the network includes an IP address.

8. The image forming apparatus according to claim 1, wherein the control device is further configured to determine whether a contactless card or a portable terminal is approaching the short-range wireless communication device on the basis of model information specifying a device type received via short-range wireless communication.

9. The image forming apparatus according to claim 1, further comprising:
a printer; and
a scanner.

10. An image forming apparatus, comprising:
a short-range wireless communication device configured to communicate with a contactless card or a portable terminal via short-range wireless communication;
a first wireless communication device configured to communicate with the portable terminal via a direct wireless connection to the portable terminal;
a second wireless communication device configured to communicate with the portable terminal via a secured network connection; and
a control device configured to:
  determine whether a device within range of the short-range wireless communication device is a contactless card or a portable terminal according to model information provided via short-range wireless communication from the device within range of the short-range wireless communication device,
  perform an authentication according to authentication information provided via short-range wireless communication when the device is determined to be a contactless card according to the model information, and establish communication between the portable terminal and the second wireless communication device via the secured network connection if the authentication is successful, and
  perform an authentication according to authentication information provided via short-range wireless communication when the device is determined to be a portable terminal according to the model information, establish communication between the portable terminal and the second wireless communication device via the secured network connection if the authentication is successful, and establish communication between the portable terminal and the first wireless communication device via the direct wireless connection if the authentication is unsuccessful.

11. The image forming apparatus according to claim 10, wherein the second wireless communication device is connected to a network via a wireless access point.

12. The image forming apparatus according to claim 10, wherein the short-range wireless communication device is a near-field communication (NFC) device.

13. The image forming apparatus according to claim 12, wherein the direct wireless connection is a Wi-Fi direct connection.

14. The image forming apparatus according to claim 10, wherein the direct wireless connection is a Wi-Fi direct connection.

15. The image forming apparatus according to claim 10, further comprising:
a printer; and
a scanner.

16. A image forming apparatus communication method, comprising:
performing an authentication process for authenticating a portable terminal within range of a short-range wireless communication device of the image forming apparatus according to information provided via short-range wireless communication from the portable terminal;
setting up a connection for data communication between the image forming apparatus and the portable terminal via a secured network only if the portable terminal has been successfully authenticated by the authentication process; and
if the portable terminal is not successfully authenticated by the authentication process, automatically setting up a connection for data communication between image forming apparatus and the portable terminal via a direct wireless connection.

17. The communication method according to claim 16, wherein the short-range wireless communication is according to a near-field communication (NFC) standard.

18. The communication method according to claim 16, wherein the direct wireless connection is a Wi-Fi direct connection.

* * * * *